United States Patent [19]
Wedman et al.

[11] 4,307,310
[45] Dec. 22, 1981

[54] SEGMENTED MAGNET DYNAMOELECTRIC MACHINE WITH SERIES CONNECTED ROTOR CONDUCTORS

[75] Inventors: Leonard N. Wedman, Radford, Va.; Roy D. Schultz, Pittsburgh, Pa.

[73] Assignee: Westinghouse Electric Corp., Pittsburgh, Pa.

[21] Appl. No.: 59,402

[22] Filed: Jul. 20, 1979

[51] Int. Cl.³ .............................................. H02K 3/16
[52] U.S. Cl. .................................. 310/177; 310/186; 310/198; 310/224
[58] Field of Search ............... 310/189, 186, 187, 178, 310/177, 220–225, 198

[56] References Cited

U.S. PATENT DOCUMENTS

| | | | |
|---|---|---|---|
| 1,742,112 | 12/1929 | Welsch | 310/198 |
| 2,562,052 | 7/1951 | MacFarlane et al. | 310/224 |
| 4,185,216 | 1/1980 | Mole | 310/186 X |

FOREIGN PATENT DOCUMENTS

| | | |
|---|---|---|
| 56743 | 1/1890 | Fed. Rep. of Germany . |
| 902643 | 1/1954 | Fed. Rep. of Germany . |
| 2512190 | 9/1976 | Fed. Rep. of Germany . |
| 638544 | 5/1928 | France . |
| 2213611 | 2/1974 | France . |
| 222273 | 10/1924 | United Kingdom . |

Primary Examiner—Donovan F. Duggan
Attorney, Agent, or Firm—G. H. Telfer

[57] ABSTRACT

A dynamoelectric machine, of the direct current type, with a circumferentially segmented stationary magnetic field structure providing magnetic poles including diametrically opposed pairs of north and south poles, with intervening poles of alternating polarity; rotor conductors extending longitudinally and selectively interconnected in sets providing a plurality of series current paths each traversing a plurality of stator active pole regions; and a pair of brushes for current collection at one or both machine ends.

6 Claims, 5 Drawing Figures

SEGMENTED MAGNET DYNAMOELECTRIC MACHINE WITH SERIES CONNECTED ROTOR CONDUCTORS

GOVERNMENT CONTRACT

The United States Government has rights in this invention pursuant to Contract No. N00014-76-C-0619 awarded by the Department of the Navy.

BACKGROUND AND SUMMARY OF THE INVENTION

The present invention relates to direct current dynamoelectric machines and, more particularly, to a machine with circumferentially segmented magnets.

The present invention is closely related to and is an improvement on the subject matter of copending application Ser. No. 891,564 by Mole et al, filed Mar. 29, 1978 and assigned to the present assignee, now U.S. Pat. No. 4,185,216, issued Jan. 22, 1980. The full disclosure of said copending application is herein incorporated by reference.

In the copending application there is described a dynamoelectric machine in which magnetic fields are developed by field windings placed in longitudinally running recesses in a cylindrical stator and energized so as to provide radial magnetic fields in polar regions between the field windings. Stator conductors are placed in slots in the polar regions. The rotor carries longitudinal conductors on its surface positioned to cut the radial magnetic fluxes, and current collecting means are provided at both ends of the machine to make electrical contact with both ends of the rotor conductors. The current collecting means is connected to the stator conductors to complete the electrical circuit of the machine. The concepts described in the copending application have been successfully demonstrated with confirmation that a machine can be produced of smaller size and weight and lower cost, or of higher power output, by the circumferentially segmented magnetic configuration as opposed to axially segmented magnet homopolar machines as are described in Mole, Pat. No. 4,041,337, issued Aug. 9, 1977. The circumferentially segmented magnet configuration makes it more practical to use brushes for current collection and adequate magnetic fields can be provided without resort to excessively bulky field coils or the complication and expense of superconducting magnets.

There remains an interest in the art to provide machines having high power density in more simplified structural configurations, particularly insofar as the minimization of electrical current collecting brushes is concerned. Applications of particular interest include ship propulsion motors and generators and other such applications where high power density machines are required.

In the copending application, embodiments of circumferentially segmented magnet machines are disclosed that generally require a large number of current collecting brushes. Each conductor of the rotor passing through the active zone requires a brush set at each end, with each set sized to carry full winding current. The situation is not appreciably improved by using brushes contacting a plurality of rotor bars simultaneously since the currents are subdivided among the bars but not among the brushes. Therefore, multiple turn windings on the rotor cannot be used to reduce the number of brushes and maintain the same power level. Fundamentally, what is needed to develop a higher voltage is that the number of passes of conductors through the active zone and the number of effective brush sets must be increased. In machines of this general character, it is the case that machine efficiency is greatly influenced by the numbers of brushes employed because of the large friction producing surface area and the large contact drop loss at each brush-conductor interface. Designs with smaller brush area are therefore desirable to result in machines whose efficiency is more determined by torque producing conductors rather than by losses of brushes. Also with fewer brush sets, the voltage gradient along the circumference of the commutator may be reduced.

The approach taken by the present invention to solutions of the foregoing problems is to use a novel magnetic geometry in the stator structure of the circumferentially segmented magnet machine that allows the rotor to have fixed interconnections between pairs of rotor conductors or bars. This reduces the number of required brushes and their associated losses. The stator comprises a field winding in a circumferentially segmented array generally in accordance with the copending application providing active zones and null zones. The magnetic core of the stator, however is also segmented such as by providing a gap or a non-magnetic spacer between stator iron portions of adjacent pole segments. The non-magnetic region, located in a null zone, ensures the magnetic isolation of one pole segment from the next. The magnetic configuration of the machine is such that the north magnetic poles of two adjacent pole segments are located adjacent to one another, separated by a null zone. The south poles of two adjacent segments are located diametrically opposite to the two adjacent north poles. There may be any even number of pole segments in the machine. When more than two segments are used, the polarity of additional poles alternates as one proceeds circumferentially from the two adjacent north poles to the two adjacent south poles. The field windings are located in the null zones and are interconnected so as to generate the magnetic field configuration described.

Stator conductors are located in slots in the active zones, connected in circuit with the brushes, to provide mmf to compensate the rotor mmf. This minimizes undesirable voltage gradients in the active zone and assists current switching at the end of the active zone and minimizes circulating current between parallel rotor conductor circuits.

The rotor is constructed generally in accordance with the embodiments of the copending application in that there are a plurality of longitudinally running, circumferentially spaced, rotor conductor bars on its outer periphery, preferably as an air gap winding although a winding in slots may also be employed. Significantly, the rotor conductors have fixed interconnections at their ends that create a series path through a plurality of the rotor conductors that are spaced a pole distance apart. The fixed interconnections are selectively provided with current collector bars for contacting the associated brushes. Brushes need be located only between two adjacent north poles and two adjacent south poles of the stator. When the current enters one brush, it splits with half going in opposite circumferential directions to rotor bar sets in different active zones. The currents pass circumferentially through end connections to rotor bars under the adjacent pole until the opposite brush set is reached. While it is possible to arrange the conductors with their brushes at only one end of the machine, it is preferred that the arrangement be such as to provide brushes on both ends of the machine, while still minimizing the numbers of required brushes as opposed to the embodiments of the copending application. This permits at all times that the conductors which are totally within the active zones of the stator magnetic field carry current.

Breaking down the elements of the basic arrangement in accordance with the invention, one finds the following characteristics:

(a) The stator has windings and a magnetic core structure providing a sequence of active and null zones around the circumference. Some even number of pole segments are provided, with twice that number of active zones. For example, considering a four pole segment machine, each active zone may encompass about 30° and each null zone about 15°; a 90° stator quadrant, beginning at one active zone, thus comprises 30° active, 15° null, 30° active, and 15° null zones in sequence and a single location within one active zone is displaced about 45° from a single corresponding location in the next active zone. A pair of north poles are adjacent each other, with a null zone between them, and a pair of south poles are adjacent each other with a null zone between. (All angles referred to are mechanical, rather than electrical, unless the context makes clear otherwise.)

(b) The number of rotor conductors is preferably large so each bar subtends only a small angle. Normally, this means a significantly larger number of rotor conductors than active zones. For example, sixty-four conductors may be provided for a machine as referred to in (a) which has four pole segments and eight active zones; and the rotor conductors are substantially uniformly spaced around the rotor (e.g. at a given rotor position, two thirds of the conductors are in active zones.)

(c) In the stationary structure, at least one brush pair is provided for contacting rotor bars that are in the two adjacent north poles of the field and in the two adjacent south poles.

(d) The rotor conductors are interconnected into a number of series sets each comprising conductors displaced from each other substantially by the 45° displacement of stator active zone locations. In a sixty-four bar example with eight active zones, eight bars spaced a pole distance may be connected in two four-bar series sets, the two sets being directly parallel by the brushes. A collector bar is provided at each interconnected pair of bars.

(e) The brush set contacts diametrically opposite positions of a series set of rotor bars while the bars of that set are located in active zones; the voltage generated therefore is that developed across the series set rather than a single bar or plurality of parallel bars.

In addition to the above, two brush sets may be used, one at each end of the machine, with the rotor bars interconnected in sets having staggered collector bars at each end. The rotor bars themselves may be disposed on the rotor in a single layer or in two layers of individually insulated bars.

Furthermore, winding conductors may be placed in parallel under the brushes so long as the parallel connected windings are within the active zone. The winding voltage may be increased by using multiple turns per pole which means that the turns that are closed under like poles do not add to the voltage of the machine so that there is an advantage to using a larger number of poles to minimize the effect of cancelled voltages.

Therefore, it can be seen that by the provision of the stator with non-magnetic spacers between adjacent pole segments and each pole segment having two active zones separated by a null zone that the rotor bars can be interconnected to achieve high power density and reduced current collection requirements.

DESCRIPTION OF THE PREFERRED EMBODIMENTS

The invention is shown and described embodied in a four pole-segment machine, although it will be understood that the machines in accordance with this invention may have any number of pole-segments of an even number and that such machines can be operated equally well as either generators or motors.

Figure 1:
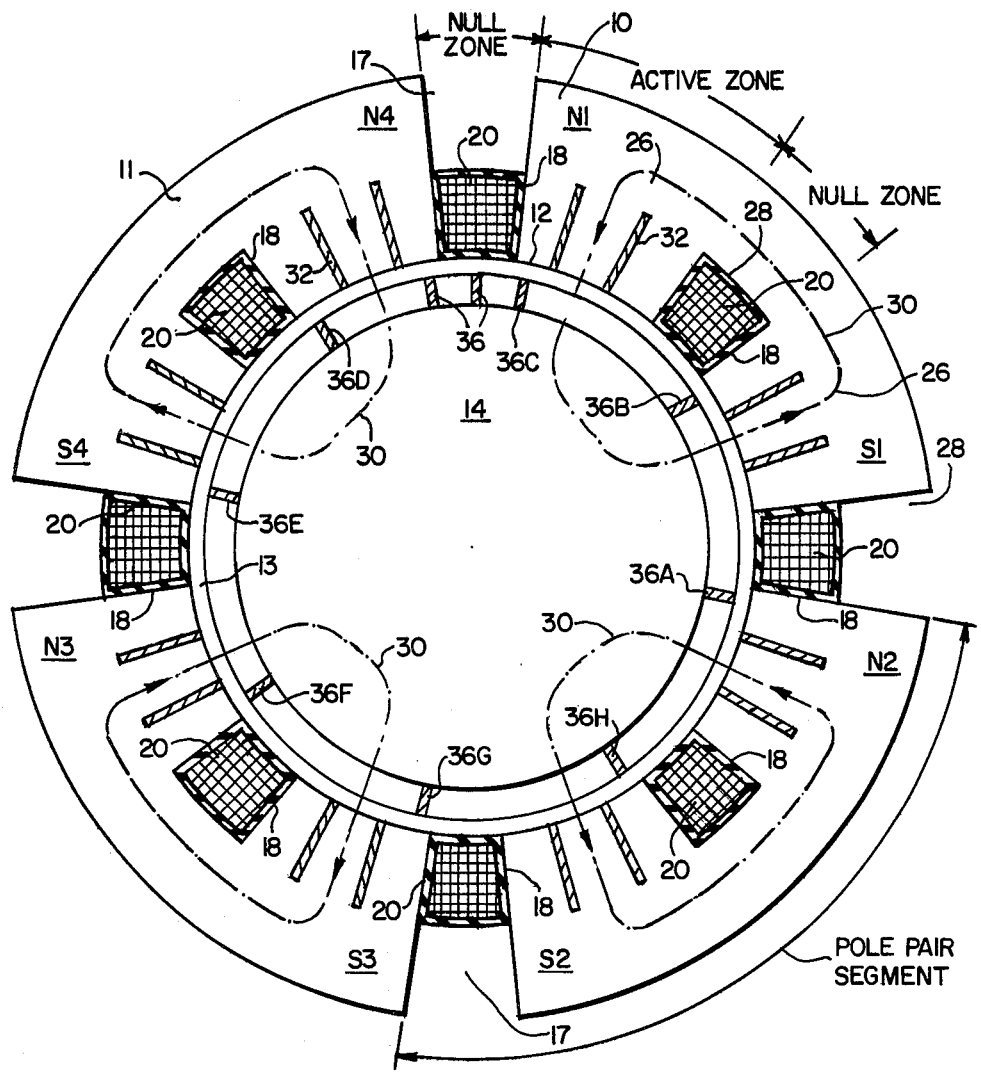
FIG. 1 is a diagrammatic transverse view of a dynamoelectric machine embodying the invention.

Referring to FIG. 1, the machine has a generally tubular stator member 10 with a cylindrical inner surface 12. A rotor 14 is disposed within the stator 10 with an air gap 13 therebetween. The mechanical arrangement of the rotor and stator and their associated elements may be generally in accordance with the description of the above referred to copending application.

The stator 10 comprises magnetic material of which all or part may be laminated. A plurality of circumferentially spaced, longitudinally extending recesses 18 are provided in the stator surface 12. Field windings 20 are disposed in the recesses 18 and extend longitudinally of the machine with end connections at the ends of the machine by circumferentially extending end turns to complete the field coil. The field windings are made up of a suitable number of conductors extending longitudinally through the recesses 18 and insulated from the magnetic core material 11. Cooling ducts for any suitable coolant can be incorporated in the field windings as desired.

The field windings 20 are connected to a source of direct current excitation, in such a manner that the direction of current flow provides magnetic fields as illustrated by reference numeral 30 extending radially across the air gap 13 between the stator and rotor. This creates a number of poles proceeding in the sequence north N1, south S1, north N2, south S2, south S3, north N3, south S4, north N4. The magnetic flux paths define polar regions in which the radial flux is concentrated into active zones 26 and inactive or null zones 28. The active zones are those in which the radial flux is concentrated while the null zones are those in which there is no radial flux except a minor amount of leakage flux.

Figure 5:
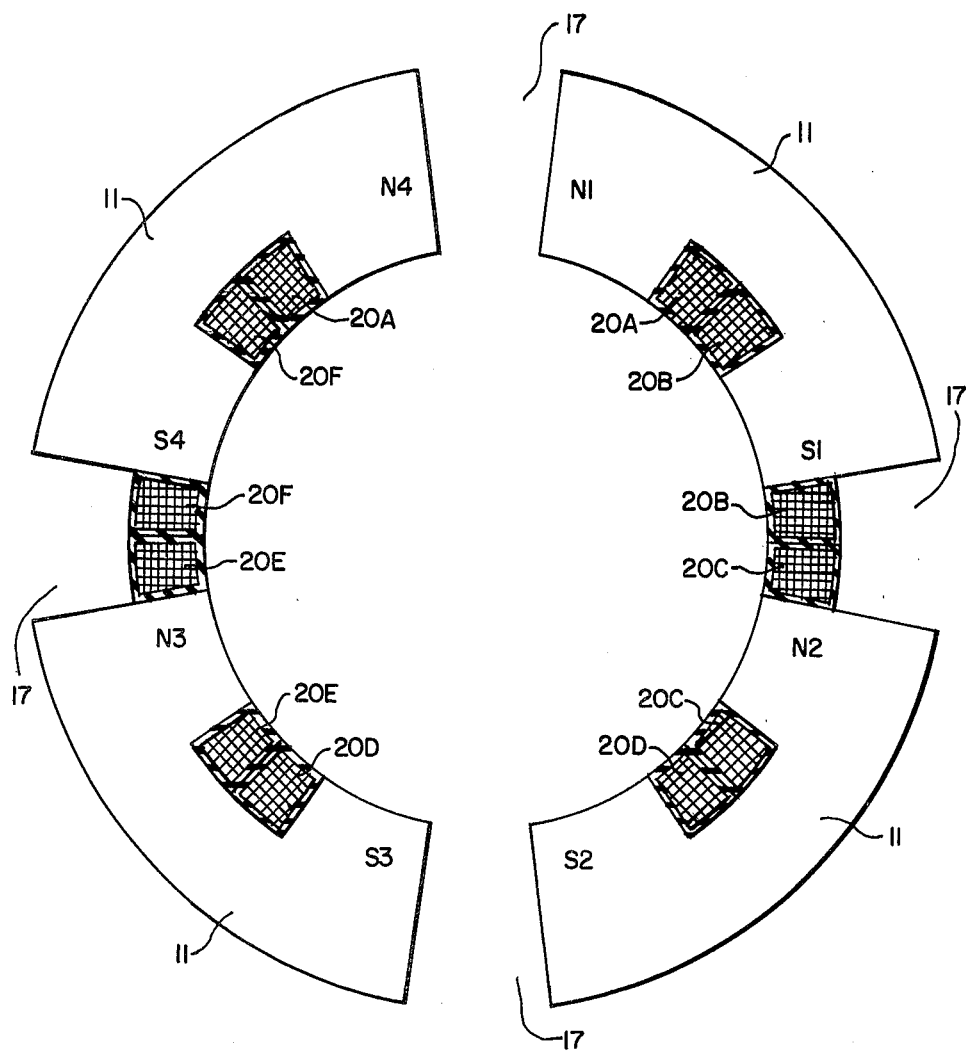
FIG. 5 is a diagrammatic view of a stator structure in accordance with the invention.

Field coils 20 are only shown very schematically in FIG. 1. What is significant is that the field coils, or any alternative employing permanent magnets, be arranged to create the magnetic fields as illustrated and described. Merely by way of further example, FIG. 5 is included to show a more specific coil arrangement for generating the required fields. In FIG. 5, magnetic core sections 11 each have a longitudinally running recess accommodating a pair of coil halves, each half of a different coil, and a pair of half coils are also located between the two core sections 11 on the right and on the left sides of the drawing. In this arrangement, no coil elements are located in the upper and lower null regions 17. Each pair of coil halves of like reference number, such as 20A, form a complete coil so that with the gaps or non-magnetic spacers 17 the full pole complement results.

Referring again to FIG. 1, stator conductors 32 are also provided which are included in the electrical circuit of the machine. The conductors 32 are placed in longitudinal slots in the pole face regions and may be of insulated copper bars or other suitable conductors. Any desired or necessary number of conductors 32 may be provided in each pole face.

Alternate ones of the field windings 20 are each provided with magnetic material 11 at their outer periphery to permit completion of the flux path around that coil portion. Th other alternate set of excitation windings 20 are each provided at their outer periphery with a non-magnetic spacer 17 or gap so that there is no flux path around that portion of the winding.

At least the outer periphery of the rotor 14 is of magnetic material, preferably laminated to reduce eddy current losses. Rotor conductors 36 of insulated conductor bars of any suitable type, preferably stranded or made up of a suitable number of wires or other conductors, transposed as necessary and formed into generally rectangular insulated bars, are disposed on the exterior rotor surface to provide an air gap winding, although a slot winding may also be used. The conductors 36 are held in place on the rotor surface in any suitable manner such as described in the copending application. The ensuing description will include more detailed examples of numbers of rotor bars and their interconnection.

Figure 2:
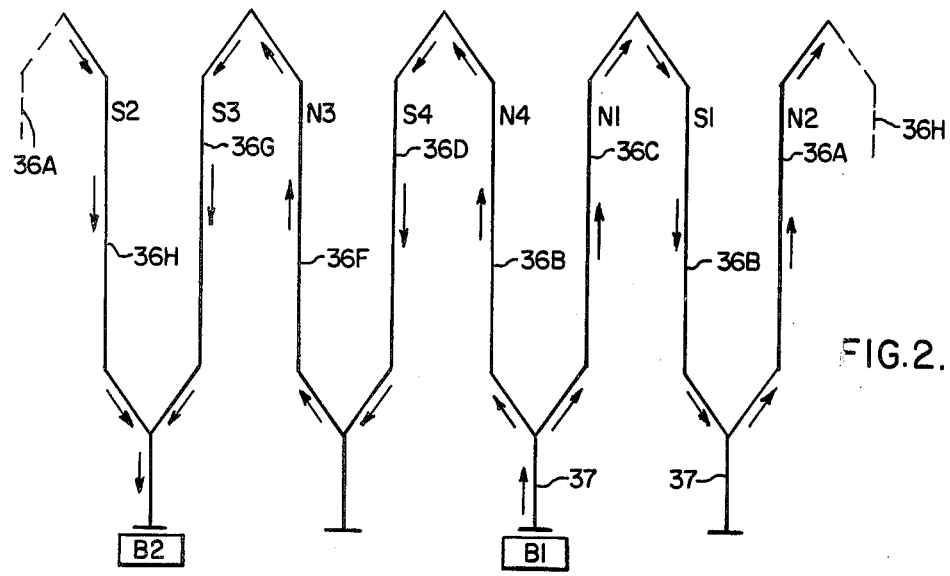
FIG. 2 is a diagrammatic developed view of a portion of a rotor, such as that of FIG. 1, showing an arrangement of conductor bars and brushes.

FIG. 2 shows rotor conductor bars 36 and their interconnection into a series set. First and second bars 36A and 36B have the connection (and a current collector 37) at one end of the machine, second and third bars 36B and 36C have connection at the other end of the machine, and so on over the circumferential periphery of the rotor. What this does is provide a continuous series path through all of the rotor bars in which adjacent bars will, when their end connection or collector bars are contacted by a brush, carry current in the same direction which then proceeds in opposite directions around the circumference of the rotor.

The configuration as shown in FIG. 2 with the north and south poles (N1, S1, etc.) corresponds to a particular relationship to the stator poles at a given rotational position of the rotor. As seen, brushes B1 and B2 are located between the two adjacent north pole (N1 and N4) conductors and at two adjacent south pole (S2 and S3) conductors; the uppermost and lowermost positions on the transverse view of FIG. 1. The current, indicated by arrows, enters one brush B1 and splits, going in opposite circumferential directions to rotor bars in different active zones. The currents pass circumferentially through end connections to rotor bars under the adjacent pole until the opposite brush B2 is reached, thus completing the current path.

FIG. 2 is representative of one of several series sets of rotor conductors, each set comprising conductors spaced by a distance substantially equal to the spacing of the stator active zones, about 45° for the stator as shown in FIG. 1. The other series sets include bars located physically a few degrees from each other and from those of the set shown. As the rotor rotates, its commutator end, which has the current collector bars 37, advances in relation to the fixed brushes and each series set successively contacts the brushes. The series set of bars 36A through 36H as shown in FIG. 2 is indicated by reference numerals on FIG. 1.

The stator conductors 32 of FIG. 1 are interconnected at their ends to each other and to the brush sets to form series paths through the active zones for current in opposite direction to that carried by the rotor conductors in the same zones, in order to complete the electrical circuit.

Figure 3:
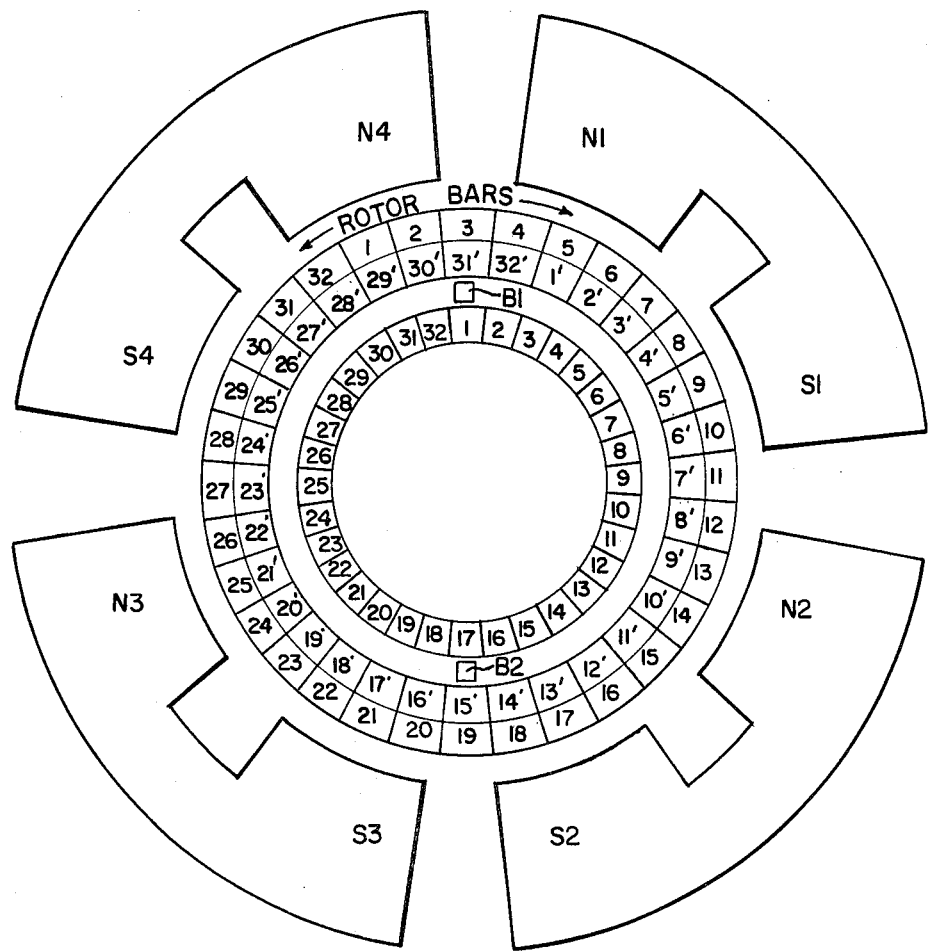
FIG. 3 is a diagrammatic transverse view of a rotor in accordance with a further embodiment of the invention.

A further embodiment of the invention will be described in reference to FIGS. 3 and 4. FIG. 3 illustrates a full complement of rotor conductors or bars which in this example are sixty-four in number. The rotor bars are disposed on the rotor in two concentric circles. For convenience as well as clarity, the bars are consecutively numbered in each of the two circles. Bars 1 through 32 are in the outer circle and bars 1' through 32' are in the inner circle. These numbers, as well as the numbers of the more centrally illustrated circle of collector bars, sequentially numbered 1 through 32, are not to be confused with any reference numerals that are applied elsewhere to the drawing.

First, it should be understood that the double layer illustration of rotor bars is primarily to facilitate an understanding of the interconnections of the bars and not necessarily to show that the bars need be located in two layers. General considerations that influence the physical layout of bars include: the desirability of a large number of bars each spanning a minimal angle of the rotor circle, utilizing the full circumference while maintaining adequate insulation levels between bars; a bar cross-section that has a low aspect ratio of its two orthogonal dimensions; a square cross-section or 1:1 ratio being the most preferred but not critical; and, of course, a structure amenable to convenient, economical fabrication. Hence, it may be desirable in some instances to provide the same number of bars shown (sixty-four) in a single layer rather than two layers.

It should also be understood that the arrangement of bars as shown in FIG. 3 in a double layer, or in a single layer, does not limit the ability to interconnect them to only one arrangement. The bars as shown in FIG. 3 may be interconnected in the form illustrated in FIG. 2, requiring brushes only at one end. However, the set of bars may alternatively be connected as shown in FIG. 4, to be described, which employs a brush set at each end of the machine.

In FIG. 3, the two circles of bars are numbered to locate a bar having an unprimed number (such as bar 1) in a first pole position (about at the center of N4) while the corresponding prime numbered bar (e.g., 1') is in the same relation to the next pole (N1), when the rotor is at a given rotational position in relation to magnetic field of the stator. If a single layer of bars were used, with a lower aspect ratio than that illustrated, the bar sequence around the rotor may proceed in the manner 1, 30', 2, 31', 3, 32', 4, 1', etc. with substantially the same results.

In accordance with FIG. 4, bars numbered as shown in FIG. 3 are selectively interconnected at their ends in the following manner:

| Bars Interconnected At One Machine End |
| --- |
| 1 and 1', connected to the collector bar 1 |
| 2 and 2', connected to the collector bar 2 |
| 32 and 32', connected to the collector bar 32 |

That is, at one end, bar x (where $1 \leq x \leq 32$) and bar x' are interconnected at collector bar x; and bars x and x' are physically displaced one pole pitch.

At the second end of the machine, where the rotor bars appear the same and a second circle of collector bars would be provided, the connections are, for this example:

| Bars Interconnected At Second Machine End |
| --- |
| 1 and 25' |
| 2 and 26' |
| 32 and 24' |

That is, at the second end bar x is connected to bar (x+24)' and the connected bars are physically displaced one pole pitch in the opposite circumferential direction.

The result of these interconnections is to form distinct counter-rotating series current paths through the bars. For example, when the rotor is at the position shown in FIG 3, current (indicated by arrows on FIG. 4) may enter brush B1' (at the end of the machine not illustrated in FIG. 3,) and divide into bars 5 and 29'. The current path through bar 5 continues through bars 5', 13, and 13' around the machine 180° to brush B2' where it is collected. The current path through bar 29' proceeds, in the opposite circumferential direction, through bars 29, 21', and 21 to brush B2'.

Another pair of counter-rotating currents is provided between brushes B1 and B2. Current introduced at B2 divides into bars 17 and 17'. The path through bar 17 continues through bars 9', 9, and 1' to brush B1. The path through bar 17' continues through bar 25, 25' and 1 to brush B1.

Figure 4:
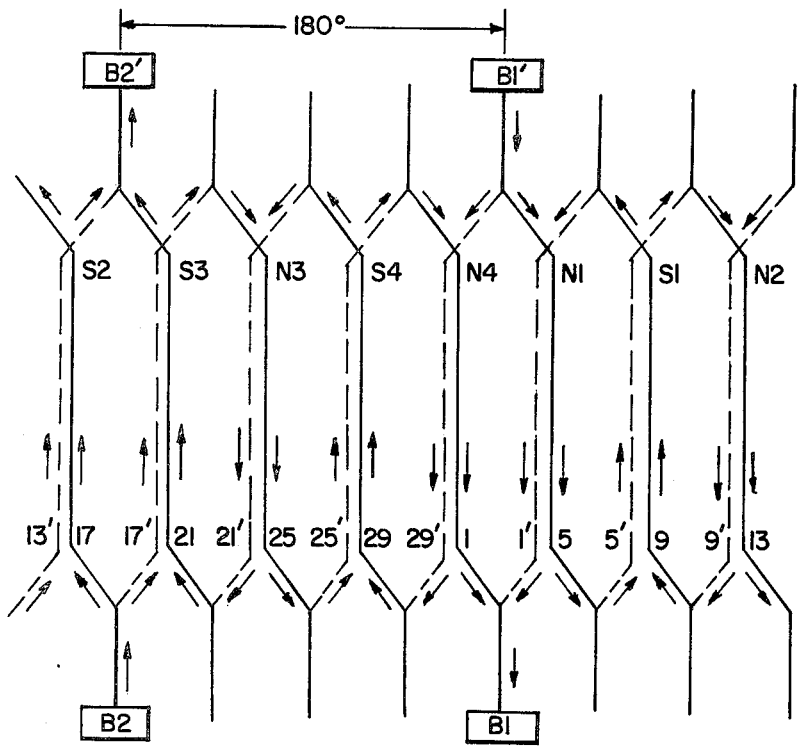
FIG. 4 is a diagrammatic developed view of a portion of a rotor surface showing an arrangement of conductors and brushes in accordance with an embodiment of the present invention.

The sixteen bars illustrated in FIG. 4 are one of four sets of the total sixty-four bars. For example, a second set interconnected the same way and in the next position from the set shown comprises bars 12', 16, 8', 12, 4', 8, 32', 4, 28', 32, 24', 28, 20', 24, 16' and 20.

Generalizing from the foregoing examples, one may see that:

(1) The stator is provided with windings and a magnetic pole structure to provide a circumferential sequence of a plurality of active and inactive (null) polar regions in which the active polar regions are uniformly spaced by the null regions from each other.

(2) The stator winding creates active pole orientations such that one pair of north poles (e.g. N1 and N4) are adjacent and one pair of south poles (e.g. S2 and S3) are adjacent with intermediate poles alternating in polarity.

(3) Current collection means (e.g. brushes B1 and B2) are located in the stationary structure to contact rotor bars that are in the adjacent pairs of north and south poles (e.g. bars 36D and 36C in N4 and N1 and bars 36H and 36G in S2 and S3 in FIG. 2; bars 1 and 1' in N4 and N1 and bars 17 and 17' in S2 and S3 of FIG. 4).

(4) The rotor structure comprises a plurality of conductors in a circumferential array; preferably an arc of a stator pole region encompasses a plurality of rotor bars.

(5) The rotor bars are selectively interconnected at their end regions to form series current paths that pass through a plurality of active zones; the paths of parallel series connected groups of bars successively contact the current collection means.

It will be readily understood that the numbers of poles, conductors, their geometry, and other features of machines in accordance with the invention may be varied from the examples given.

What is claimed is:

1. A dynamoelectric machine comprising: a stator member having a cylindrical internal surface and a cylindrical rotor member supported for rotation coaxially of the stator member, said stator member having a circumferentially segmented field winding electrically connected in a manner to produce radially-directed magnetic fields in the spaces between said segmented field winding, the magnetic fields alternating in polarity around the machine except that a pair of north poles are adjacent, and a pair of south poles are adjacent each other on the opposite side of the machine from said pair of north poles, a plurality of rotor conductors extending longitudinally of the rotor member, current-collecting means at at least one end of the machine for making electrical contact with said rotor conductors, and means for electrically connecting the current-collecting means to form a complete electrical circuit;

said radial magnetic fields being limited to active zones separated by inactive zones which are substantially free of radial magnetic flux, and said current-collecting means being disposed to make contact only with the rotor conductors passing through said active zones;

said rotor conductors being selectively inter-connected at their ends to form a plurality of series current paths therethrough corresponding to the location of a plurality of stator active zones.

2. A dynamoelectric machine as defined in claim 1 in which: said current-collecting means are connected to stator conductors, extending longitudinally in said active zones, in a manner such that said stator conductors in each active zone carry currents opposite to the currents flowing in the rotor conductors passing through that zone.

3. A dynamoelectric machine as defined in claim 1 in which: said rotor conductors include contact means at said at least one end of the machine, and said current-collecting means comprises stationary brushes engaging the contact means of the rotor conductors passing through the active zones.

4. A dynamoelectric machine as defined in claim 1 wherein: corresponding locations in said active zones are physically spaced on the stator by a given angle and rotor bars interconnected in each of said plurality of series current paths are spaced from each other on said rotor by substantially said same given angle.

5. A dynamoelectric machine as defined in claim 3 wherein: a single pair of brushes is provided at only one end of the machine.

6. A dynamoelectric machine as defined in claim 3 wherein: a single pair of brushes is provided at each end of the machine for simultaneously contacting different ones of said rotor conductors.

* * * * *